(12) United States Patent
Takeda et al.

(10) Patent No.: US 10,524,238 B2
(45) Date of Patent: Dec. 31, 2019

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/573,310

(22) PCT Filed: May 13, 2016

(86) PCT No.: PCT/JP2016/064245
§ 371 (c)(1),
(2) Date: Nov. 10, 2017

(87) PCT Pub. No.: WO2016/182051
PCT Pub. Date: Nov. 17, 2016

(65) Prior Publication Data
US 2018/0139749 A1    May 17, 2018

(30) Foreign Application Priority Data
May 14, 2015   (JP) ................................. 2015-099422

(51) Int. Cl.
*H04W 72/04* (2009.01)
*H04L 5/00* (2006.01)
*H04W 72/12* (2009.01)

(52) U.S. Cl.
CPC ....... *H04W 72/0413* (2013.01); *H04L 5/0055* (2013.01); *H04W 72/0446* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2013/0114554 A1* | 5/2013 | Yang | H04W 24/10 370/329 |
| 2013/0121270 A1* | 5/2013 | Chen | H04L 5/001 370/329 |

(Continued)

OTHER PUBLICATIONS

Extended European Search Report issued in corresponding European Application No. 16792775.5, dated Feb. 12, 2018 (15 pages).

(Continued)

*Primary Examiner* — Hassan A Phillips
*Assistant Examiner* — Gautam Sharma
(74) *Attorney, Agent, or Firm* — Osha Liang LLP

(57) ABSTRACT

According to the present invention, periodic CSI reporting that is suitable for use when the number of component carriers that can be configured per user terminal is expanded more than in existing systems can be implemented. According to the present invention, a user terminal has a transmission section that transmits channel state information periodically, and a control section that controls the transmission of the channel state information, and the control section controls the transmission of a plurality of channel state information using a PUCCH format which can use a plurality of resource blocks and/or which has a smaller spreading factor than the spreading factor of PUCCH format 3.

5 Claims, 14 Drawing Sheets

(56) References Cited

U.S. PATENT DOCUMENTS

| | | | | |
|---|---|---|---|---|
| 2013/0182789 A1* | 7/2013 | Ko | ............... | H04B 7/0626 375/267 |
| 2013/0242902 A1* | 9/2013 | Liu | ............... | H04W 24/10 370/329 |
| 2013/0258874 A1* | 10/2013 | Khoshnevis | ......... | H04L 5/0057 370/252 |
| 2013/0343322 A1* | 12/2013 | Lee | ............... | H04B 7/2656 370/329 |
| 2014/0003345 A1* | 1/2014 | Chu | ............... | H04W 24/02 370/328 |
| 2014/0003452 A1* | 1/2014 | Han | ............... | H04L 1/1657 370/474 |
| 2014/0036664 A1* | 2/2014 | Han | ............... | H04W 4/70 370/230 |
| 2014/0269383 A1* | 9/2014 | He | ............... | H04W 28/24 370/252 |

OTHER PUBLICATIONS

Intel Corporation; "Views on UL control enhancements for CA operation"; 3GPP TSG-RAN WG1 #80Bis, R1-151438; Belgrade, Serbia; Apr. 20-24, 2015 (4 pages).

Huawei, HiSilicon; "On CA enhancements supporting up to 32 component carriers"; 3GPP TSG RAN WG1 Meeting #80bis, R1-151851; Belgrade, Serbia; Apr. 20-24, 2015 (7 pages).

International Search Report issued in PCT/JP2016/064245 dated Aug. 2, 2016 (2 pages).

Written Opinion of the International Searching Authority issued in PCT/JP2016/064245 dated Aug. 2, 2016 (5 pages).

NTT DOCOMO, Inc.; "Views on UL control signalling enhancements for LTE CA up to 32 component carriers"; 3GPP TSG RAN WG1 Meeting #80bis, R1-151969; Belgrade, Serbia; Apr. 20-24, 2015 (6 pages).

Alcatel-Lucent et al.; "Multi-Cell Periodic CSI Multiplexing"; 3GPP TSG RAN WG1 Meeting #70, R1-123127; Qingdao, China; Aug. 13-17, 2012 (4 pages).

Catt; "CSI feedback for up to 32 CCs"; 3GPP TSG RAN WG1 Meeting #80bis, R1-151350; Belgrade, Serbia; Apr. 20-24, 2015 (5 pages).

Samsung; "Priority rules for periodic CSI feedback in carrier aggregation"; 3GPP TSG RAN WG1 Meeting #64, R1-110735; Taipei, Taiwan; Feb. 21-25, 2011 (4 pages).

LG Electronics; "Multi-cell Periodic CSI Transmission"; 3GPP TSG RAN WG1 Meeting #70, R1-123500; Qingdao, China; Aug. 13-17, 2012 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Notification of Reasons for Refusal for Japanese Patent Application No. 2015-099422, dated Nov. 15, 2016, 11 pages.

Notification of Reasons for Rejection for Japanese Patent Application No. 2015-099422, dated Jul. 26, 2016, 9 pages.

Office Action issued in counterpart European Patent Application No. 16792775.5, dated Feb. 1, 2019 (6 Pages).

* cited by examiner

Table 1 Special fields for Semi-statically scheduled PUSCH for P-CSI Activation PDCCH/EPDCCH Validation

| | DCI format 0 |
|---|---|
| TPC command for scheduled PUSCH | set to '00' |
| Cyclic shift DM RS | set to '000' |
| Redundancy version | MSB is set to '0' |
| HARQ process number | N/A |
| Redundancy version | N/A |

NOTE: The UE should transmit P-CSI with the configured MCS field. UE with higher SINR should enjoy higher modulation scheme.

FIG. 8

Table 2 Special fields for Semi-statically scheduled PUSCH for P-CSI Release PDCCH/EPDCCH Validation

| | DCI format 0 |
|---|---|
| TPC command for scheduled PUSCH | set to '00' |
| Cyclic shift DM RS | set to '000' |
| Modulation and coding scheme and redundancy version | set to '11111' |
| Resource block assignment and hopping resource allocation | Set to all '0's |
| HARQ process number | N/A |
| Modulation and coding scheme | N/A |
| Redundancy version | N/A |
| Resource block assignment | N/A |

FIG. 9

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunication System) network, the specifications of long term evolution (LTE) have been drafted for the purpose of further increasing high speed data rates, providing lower delays and so on (see non-patent literature 1). LTE Advanced (also referred to as LTE Rel. 10, 11 or 12) is specified for the purpose of further broadbandization and speed-up from LTE (also referred to as LTE Rel. 8), and a successor system (also referred to as LTE Rel. 13 or the like) is also under study.

The system band in LTE Rel. 10/11 includes at least one component carrier (CC), where the LTE system band of LTE Rel. 8 constitutes one unit. Such bundling of a plurality of CCs into a wide band is referred to as "carrier aggregation" (CA).

In LTE of Rel. 8 to 12, the specifications have been drafted assuming exclusive operations in frequency bands that are licensed to operators—that is, licensed bands. For licensed bands, for example, 800 MHz, 2 GHz and/or 1.7 GHz have been in use.

In LTE of Rel. 3 and later versions, operation in frequency bands where license is not required—that is, unlicensed bands—is also a target of study. For unlicensed band, for example, 2.4 GHz, which is the same as in Wi-Fi, or the 5 GHz band and/or the like may be used. Although carrier aggregation (LAA: license-assisted access) between licensed bands and unlicensed bands is placed under study in Rel. 13 LTE, there is a possibility that, in the future, dual connectivity and unlicensed-band stand-alone will becomes targets of study as well.

CITATION LIST

Non-Patent Literature

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In the carrier aggregation of LTE Rel. 10-12, the number of component carriers that can be configured per user terminal is limited to maximum five. In carrier aggregation in and after LTE Rel. 13, a study is in progress to expand the number of CCs that can be configured per user terminal to six or more in order to realize further band expansion.

When the number of CCs that can be configured in a user terminal is expanded to six or more (for example, 32), it becomes difficult to use the transmission methods of existing systems (Rel. 10 to 12) on an as-is basis. For example, in existing systems, periodic CSI reporting (P-CSI reporting) in which a user terminal transmits channel state information (CSI) in subframes of a predetermined cycle is supported.

However, in the periodic CSI reporting of existing systems, channel state information of only one CC is transmitted in a subframe of a predetermined cycle. For this reason, the periodic CSI reporting method of existing systems is likely to be unsuitable to cases where the channel state information of many CCs needs to be reported, such as when the number of CCs is expanded to 6 or more.

The present invention has been made in view of the above points, and it is therefore an object of the present invention to provide a user terminal, a radio base station and a radio communication method that can implement periodic CSI reporting that is suitable for use when the number of component carriers (CCs) that can be configured per user terminal is expanded more than in existing systems.

Solution to Problem

One aspect of the user terminal of the present invention provides a user terminal that has a transmission section that transmits channel state information periodically, and a control section that controls the transmission of the channel state information, and, in this user terminal, the control section controls the transmission of a plurality of channel state information using a PUCCH format which can use a plurality of resource blocks and/or which has a smaller spreading factor than the spreading factor of PUCCH format 3.

Advantageous Effects of Invention

According to the present invention, periodic CSI reporting that is suitable for use when the number of component carriers (CCs) that can be configured per user terminal is expanded more than in existing systems can be implemented.

BRIEF DESCRIPTION OF DRAWINGS

FIG. 8 is a diagram to explain an example of periodic CSI reporting according to the sixth example;

FIG. 9 is a diagram to explain an example of periodic CSI reporting according to the sixth example;

DESCRIPTION OF EMBODIMENTS

Figure 1:
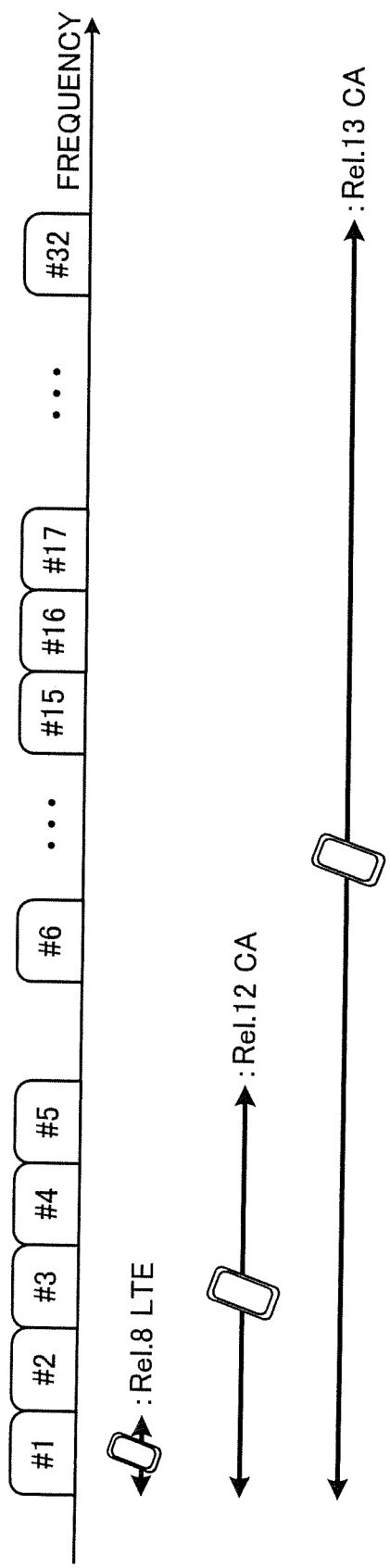
FIG. 1 is a diagram to explain carrier aggregation.

FIG. 1 is a diagram to explain carrier aggregation (CA). As shown in FIG. 1, in CA of up to LTE Rel. 12, maximum five component carriers (CCs) (CC #1 to CC #5) are bundled, where the system band of LTE Rel. 8 constitutes one unit. That is, in carrier aggregation up to LTE Rel. 12, the number of CCs that can be configured in a user terminal (UE: User Equipment) is limited to maximum five (one primary cell and maximum four secondary cells).

Meanwhile, in carrier aggregation of LTE Rel. 3, a study is in progress to further expand the band by bundling six or more CCs. That is, in carrier aggregation of LTE Rel. 3, expansion of the number of CCs (cells) that can be configured per user terminal to 6 or more (CA enhancement) is being studied. For example, as shown in FIG. 1, when 32 CCs (CC #1 to CC #32) are bundled, a bandwidth of maximum 640 MHz can be secured.

In this way, more flexible and faster radio communication is expected to be made possible by increasing the number of CCs that can be configured in a user terminal. Also, expanding the number of CCs like this is an effective way to widen the band based on carrier aggregation (LAA: License-Assisted Access) between licensed bands and unlicensed bands. For example, five licensed band CCs (=100 MHz) and fifteen unlicensed band CCs (=300 MHz) are bundled, and a bandwidth of 400 MHz can be secured.

By the way, in existing systems (LTE Rel. 10 to 12), periodic CSI reporting, in which the user terminal transmits channel state information (CSI) in subframes of a predetermined cycle, is supported. In periodic CSI reporting, when uplink user data is present, the user terminal transmits CSI using an uplink shared channel (PUSCH: Physical Uplink Shared Channel). On the other hand, if there is no uplink user data, the user terminal transmits CSI using an uplink control channel (PUCCH: Physical Uplink Control Channel). CSI transmitted in periodic CSI reporting may be referred to as "periodic CSI" or "P-CSI," and will be referred to as "P-CSI" below.

In existing systems, PUCCH formats 2, 2a, 2b and 3 are supported as P-CSI transmission formats using an uplink control channel. These existing PUCCH formats can only transmit P-CSI for one CC (cell). Therefore, when transmitting P-CSI for a plurality of CCs (cells) using an existing PUCCH format, the user terminal transmits the P-CSI for a plurality of CCs in different subframes (time division multiplexing). Also, when P-CSI transmissions pertaining to a plurality of CCs (cells) collide in the same subframe, the user terminal transmits one CC's P-CSI, which is selected according to a predetermined rule, and stops transmitting (drops) the rest of the CCs' P-CSI.

However, when P-CSI for 6 or more CCs (cells) is transmitted in different subframes using an existing PUCCH format, it is expected that the P-CSI reporting cycle becomes longer than in existing systems in each CC. For example, if an attempt to transmit P-CSI for 32 CCs using an existing PUCCH format is made, the P-CSI reporting cycle in each CC will be 32 ms at the shortest. When a CC (PCell or PUCCH-SCell) that transmits a PUCCH is a TDD carrier, the number of uplink subframes that can transmit the PUCCH is limited. For example, when using an uplink/downlink configuration (UL-DL configuration) with a DL/UL ratio of 5:1, it is necessary to multiply the cycle by 5. Normally, on the side of the radio base station, it is desirable to acquire P-CSI from the user terminal in a timely manner, and therefore it is not desirable to increase the P-CSI reporting cycle of each CC.

Also, if P-CSI for 6 or more CCs (cells) is transmitted using an existing PUCCH format, this might lead to increased collisions of P-CSI among multiple CCs (cells) in the same subframe. In such a case, the amount of information that is stopped from being transmitted (that is, dropped) is likely to increase.

As described above, the existing periodic CSI reporting method to use existing PUCCH formats is more likely to be unsuitable to cases where P-CSI of a large number of CCs (cells) needs to be reported, such as when the number of CCs (cells) that can be configured per user terminal is expanded to 6 or more (for example, 32).

Here, when the number of CCs (cells) that can be configured per user terminal is expanded to 6 or more (for example, 32), it is necessary to make it possible to transmit transmission acknowledgment information (HARQ-ACKs) in response to downlink signals from 6 or more CCs. For this reason, in LTE Rel. 3, a format (hereinafter referred to as "new PUCCH format") is under study, in which can transmit transmission acknowledgment information in response to a larger number of CCs than existing PUCCH formats 1a, 1b and 3 can. This new PUCCH format is expected to have larger capacity than existing PUCCH formats 2, 2a, 2b and 3 that can transmit one CC's P-CSI.

Accordingly, the present inventors have found that, when the number of CCs that can be configured per user terminal is expanded to 6 or more, the amount of P-CSI to be reported in subframes of a predetermined cycle can be increased by transmitting at least one CC's P-CSI by using a PUCCH format (hereinafter referred to as "new PUCCH format") having larger capacity than existing PUCCH formats that are for use when the number of CCs to configure is 5 or less (first to fifth examples).

Furthermore, the present inventors have found that, when the number of CCs that can be configured per user terminal is expanded to six or more, the amount of P-CSI to be reported in subframes of a predetermined cycle can be increased by transmitting at least one CC's P-CSI by using a PUSCH even in subframes in which no uplink user data is transmitted (sixth example).

Now, the present embodiment will be described the following in detail. Note that, although examples in which the number of CCs that can be configured per user terminal in carrier aggregation is 32 will be described below, this is by no means limiting. Also, CCs may be referred to as "cells" or "serving cells."

In addition, P-CSI includes at least one of a channel quality indicator (CQI), a precoding matrix indicator (PMI), and a rank indicator (RI). As mentioned above, P-CSI may be referred to as "periodic CSI," "CSI," or the like.

Furthermore, transmission acknowledgment information includes ACKs/NACKs (Acknowledgments/Non-ACKs) for downlink signals (for example, the PDSCH (Physical Downlink Shared CHannel)). The transmission acknowledgment information may be referred to as "HARQ-ACKs" (Hybrid Automatic Repeat reQuest-ACKs), "ACK/NACKs," "transmission acknowledgment signals" or the like.

FIRST EXAMPLE

In a first example, the user terminal transmits P-CSI of a plurality of CCs (cells) using a new PUCCH format in subframes of a predetermined cycle. This can increase the amount of P-CSI that can be reported in subframes of a predetermined cycle, which is preferable when the number of CCs that can be configured per user terminal is expanded to six or more.

To be more specific, the user terminal receives (as configuration) the transmission subframe information for P-CSI from the radio base station by way of higher layer signaling (for example, RRC signaling). The transmission subframe information here refers to information that indicates the subframe to transmit P-CSI (hereinafter also referred to as a "transmission subframe"), and at least the cycle (interval) of this transmission subframe and the offset value of this transmission subframe with respect to the beginning of the radio frame are included. The user terminal transmits P-CSI of a plurality of CCs using a new PUCCH format in this transmission subframe of a predetermined cycle indicated by the transmission subframe information.

Figure 2:
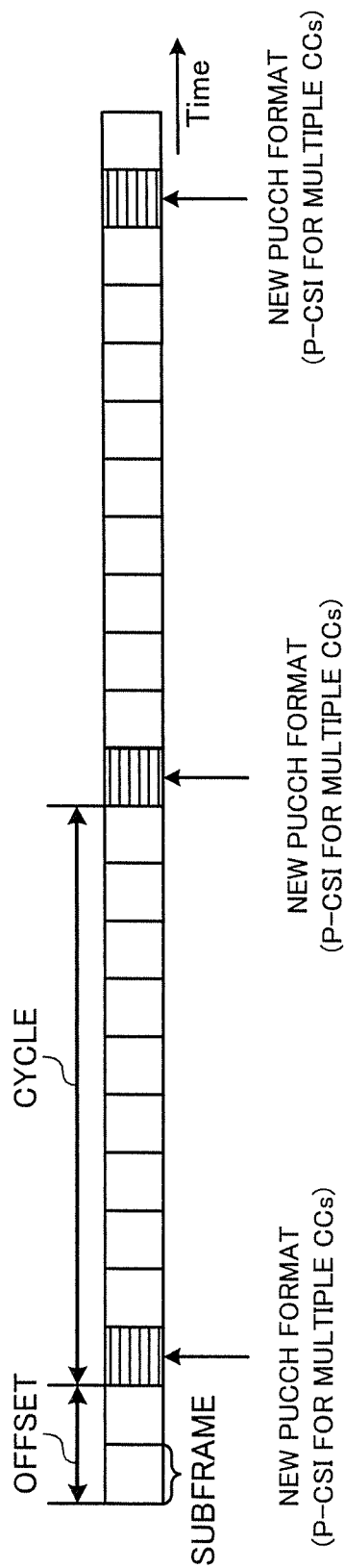
FIG. 2 is a diagram to explain an example of periodic CSI reporting according to the first example.

FIG. 2 is a diagram to explain an example of periodic CSI reporting according to the first example. In FIG. 2, an example in which the cycle of the P-CSI transmission subframe is 10 ms and the offset value with respect to the beginning of the radio frame is 2 ms will be described, but the present invention is not limited to this. The cycle and the offset value of the P-CSI transmission subframe can be appropriately changed by higher layer signaling-based reporting from the radio base station.

As shown in FIG. 2, the user terminal multiplexes P-CSI for a plurality of CCs in a transmission subframe of a predetermined cycle (here, 10 ms) using a new PUCCH format. In this manner, the user terminal transmits P-CSI for a plurality of CCs using a new PUCCH format irrespective of whether or not transmission acknowledgment information in response to downlink signals is transmitted in the transmission subframe of a predetermined cycle.

Note that the P-CSI for a plurality of CCs transmitted in a new PUCCH format may be P-CSI for all CCs configured in the user terminal or may be P-CSI for part of the CCs. When the total amount of P-CSI information for all CCs exceeds a predetermined value (for example, the maximum payload in the new PUCCH format), the user terminal may selects the P-CSI of part of the CCs, according to a predetermined rule.

<New PUCCH Format>

Here, new PUCCH formats will be described in detail. A new PUCCH format has larger capacity (the number of bits and payload) than existing PUCCH formats 1a, 1b, 2, 2a, 2b and 3, and/or others. A new PUCCH format may be comprised of radio resources that can multiplex 64 to 256 bits, for example. In addition, a new PUCCH format may be referred to as "PUCCH format 4," "large capacity PUCCH format," "enhanced PUCCH format," "new format," and the like.

For example, it is possible to reduce the spreading factor of PUCCH format 3 and use it as a new PUCCH format (PUCCH format 3 with spreading factor reduction). In existing PUCCH format 3, the same bit sequence is duplicated in five or four time symbols and multiplied by orthogonal spreading codes. The sequences are multiplied by user-specific orthogonal spreading codes, and are therefore orthogonally multiplexed. By configuring the orthogonal code length to 1, for example, it is possible to place different information bit sequences on five or four time symbols. However, in this case, the number of users that can be multiplexed on the same PRB decreases. For example, when the orthogonal code length is although the bit sequence length that can be transmitted is five times or four times as long as existing PUCCH format 3, the number of users that can be multiplexed is one.

Also, as a new PUCCH format, a PUCCH format that uses frequency resources of two or more PRBs may be specified. For example, if a PUCCH format to be transmitted in two PRBs (Multi-PRB PUCCH format 3) can be provided based on the configuration of existing PUCCH format 3, twice the bit sequence of existing PUCCH format 3 can be transmitted. What number of PRBs are used and which PRBs are used for transmission may be determined by the UE according to the number of bits of transmission acknowledgment information and/or CSI to be multiplexed on this PUCCH, may be specified in advance by higher layer signaling such as RRC signaling, or may be specified by the base station, on a per subframe basis, by using control signals such as the PDCCH.

Also, as a new PUCCH format, a PUCCH format using two or more orthogonal spreading codes (OCCs) may be defined. For example, instead of orthogonal-multiplexing multiple users by using multiple orthogonal spreading codes based on the existing PUCCH format 3 configuration, P-CSI of multiple CCs may be orthogonal-multiplexed (multi-code PUCCH format 3).

Furthermore, as a new PUCCH format, a PUCCH format using m-ary modulation of 16 QAM or above may be specified. For example, if a PUCCH format to apply 16 QAM modulation to UCI is provided based on the configuration of existing PUCCH format 3, twice the bit sequence of existing PUCCH format 3 can be transmitted. Which modulation scheme to use may be determined by the UE according to the number of bits of transmission acknowledgment information and/or CSI to be multiplexed on this PUCCH, may be specified in advance by higher layer signaling such as RRC signaling, or may be specified by the base station, on a per subframe basis, by using control signals such as the PDCCH.

In the above description, "based on the configuration of existing PUCCH format 3" means re-using the coding method for UCI such as transmission acknowledgment information and/or CSI, the order of mapping to radio resources, the temporal symbol locations of reference signals included in PUCCH format 3, and so on. The reference signal sequences for generating reference signals may be different than the case of one PRB. For example, it is possible to use a reference signal sequence that is multiplexed on the PUSCH of two PRBs stipulated in existing LTE. Furthermore, the new PUCCH formats are not limited to those exemplified above, and can be appropriately changed.

SECOND EXAMPLE

In the second example, based on whether or not transmission acknowledgment information is transmitted in the P-CSI transmission subframe of a predetermined cycle, indicated by the above-mentioned transmission subframe information, the user terminal controls the PUCCH format to apply to this transmission subframe.

To be more specific, if there is no transmission acknowledgment information to be transmitted in the P-CSI transmission subframe, the user terminal transmits one CC's P-CSI using existing PUCCH formats. When a plurality of CCs' P-CSI collides in this transmission subframe, the user terminal transmits one CC's P-CSI, which is selected according to a predetermined rule (for example, a rule stipulated in LTE Rel. 0 to 12), and stops (drops) transmitting the rest of the CCs' P-CSI. For the PUCCH format in this case, PUCCH format 2, conventionally used in P-CSI reporting, can be used. In this case, PUCCH format 2 is designed for P-CSI reporting for one CC and therefore can be multiplexed with PUCCH formats 2 of other terminals, so that it is possible to avoid increasing the overhead of UL control signals.

On the other hand, when there is transmission acknowledgment information to be transmitted (when transmission acknowledgment information for at least 1 CC is transmitted) in the P-CSI transmission subframe, the user terminal may transmit this transmission acknowledgment information and at least one CC's P-CSI using a new PUCCH format. When the P-CSI of a plurality of CCs collides in this transmission subframe, the user terminal transmits the transmission acknowledgment information and one or more CCs' P-CSI, determined according to a predetermined rule (see the fourth example).

Also, if there is transmission acknowledgment information transmitted in a P-CSI transmission subframe, the user terminal controls the PUCCH format to apply to this transmission subframe according to the number of CCs the transmission acknowledgment information covers. For example, when transmission acknowledgment information for 6 or more CCs is transmitted in a P-CSI transmission subframe, the user terminal may transmit this transmission acknowledgment information and one or more CC's P-CSI using a new PUCCH format.

On the other hand, when transmission acknowledgment information for one CC is transmitted in a P-CSI transmission subframe, the user terminal may transmit this transmission acknowledgment information and one CC's P-CSI using PUCCH format 2a/2b (fallback). Furthermore, when transmission acknowledgment information for five or fewer CCs is transmitted in the above transmission subframe, the user terminal may transmit this transmission acknowledgment information and one CC's P-CSI using PUCCH format 3 (fallback).

Figure 3:
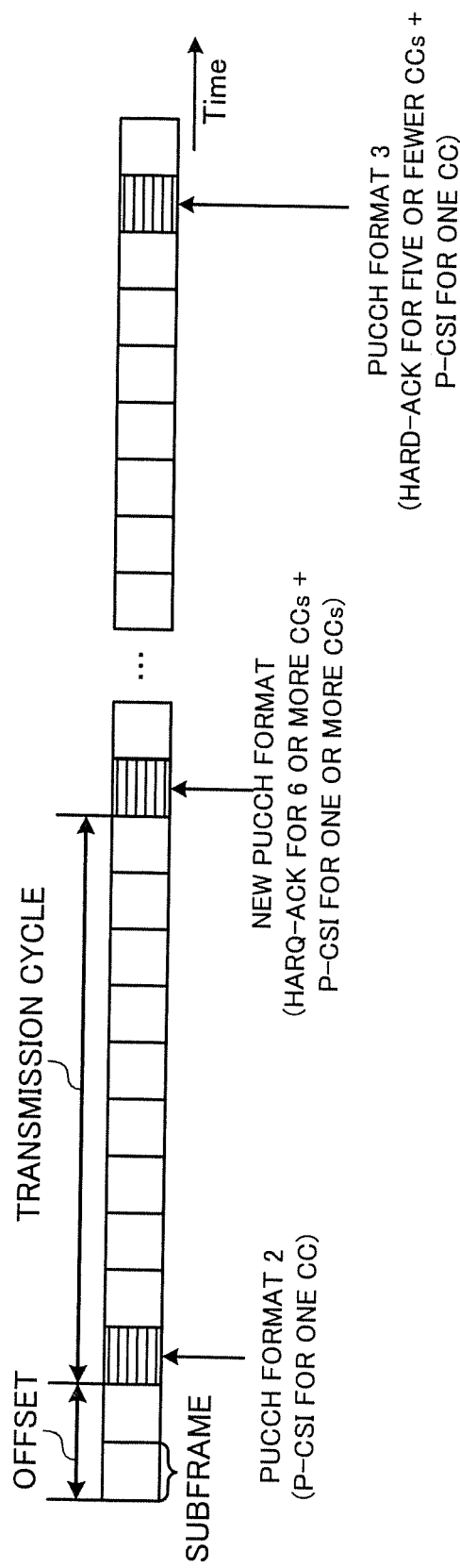
FIG. 3 is a diagram to explain an example of periodic CSI reporting according to the second example.

Referring to FIG. 3, an example of control of the user terminal according to the second example will be described in detail. The premise in FIG. 3 is that the user terminal transmits the transmission subframe information described in the first example, information about CA (for example, whether or not CA is applied, the number of CCs, etc.), information about each CC's P-CSI (for example, the mode of reporting, the type reporting and so on, which will be described in the fourth example). The above higher layer signaling may be one for use in CA of 5 or fewer CCs (CA of LTE Rel. 10 to 12), or may be one newly defined for use in CA of 6 or more CCs (CA of LTE Rel. 3).

If the user terminal does not transmit transmission acknowledgment information in a P-CSI transmission subframe (in FIG. 3, the third subframe from the left), the user terminal transmits only one CC's P-CSI using existing PUCCH format 2. If P-CSI for a plurality of CCs collides in this transmission subframe, the user terminal transmits one CC's P-CSI, which is selected according to a predetermined rule (for example, a rule stipulated in LTE Rel. 10 to 12), and stops (drops) transmitting the rest of the CCs' P-CSI.

On the other hand, when the user terminal transmits transmission acknowledgment information for six or more CCs in a P-CSI transmission subframe (in FIG. 3, the thirteenth subframe from the left), the user terminal transmits the transmission acknowledgment information for six or more CCs and P-CSI for one or more CCs using a new PUCCH format. In case the P-CSI of a plurality of CCs collides in the transmission subframe, the user terminal transmits the transmission acknowledgment information and one or more CCs' P-CSI, which is determined according to a predetermined rule (for example, a priority rule that will be described in the fourth example).

Also, when transmission acknowledgment information for five or fewer CCs is transmitted in a P-CSI transmission subframe (the second subframe from the right in FIG. 3), the user terminal transmits the transmission acknowledgment information and one CC's P-CSI using PUCCH format 3. Also, although not shown in the drawing, when the user terminal transmits transmission acknowledgment information for only one CC in a P-CSI transmission subframe, the user terminal transmits the transmission acknowledgment information and one CC's P-CSI using PUCCH format 2a/2b.

Thus, in FIG. 3, the PUCCH format to be used in transmission subframes is changed depending on for how many CCs transmission acknowledgment information is transmitted in P-CSI transmission subframes, but this is by no means limiting. As described above, when transmission acknowledgment information is transmitted in P-CSI transmission subframes (in FIG. 3, the thirteenth subframe from the left and the second subframe from the right), The user terminal may transmit the acknowledgment information and the P-CSI for one or more CCs using a new PUCCH format regardless of the number of CCs the acknowledgment information pertains to.

In the second example, the PUCCH format to apply to transmission subframes is controlled based on the presence or absence of transmission acknowledgment information and the number of CCs in P-CSI transmission subframes. Therefore, it is possible to implement periodic CSI reporting that is suitable for when the number of CCs that can be configured per user terminal is expanded to 6 or more, by using new PUCCH formats for transmitting transmission acknowledgment information for 6 or more CCs as appropriate.

As for the new PUCCH formats to use in the second example, the various formats described in the first example can be used. Although, in the above description, transmission acknowledgment information and P-CSI for one or more CCs are multiplexed in new PUCCH formats, it is equally possible to multiplex transmission acknowledgment information and a plurality of P-CSI.

THIRD EXAMPLE

In a third example, the coding method used when the user terminal according to the second example transmits acknowledgment information and P-CSI for one or more CCs using a new PUCCH format will be described. The third example can be combined with the second example described above.

As described in the second example, a new PUCCH format may be used when there is transmission acknowledgment information to be transmitted in a P-CSI transmission subframe (that is, when transmission acknowledgment information for one or more CCs is transmitted), or may be used only when transmission acknowledgment information for 6 or more CCs is transmitted. "Transmission acknowledgment information" in the following description (in particular, in the description of the third to fifth examples) may include transmission acknowledgment information for one or more CCs. Similarly, "P-CSI" may include P-CSI for one or more CCs.

As for the method of encoding transmission acknowledgment information and P-CSI, joint coding, separate coding and the like are conceivable. In joint coding, transmission acknowledgment information and P-CSI are concatenated and encoded into a single information bit sequence. On the other hand, in separate coding, transmission acknowledgment information and P-CSI are separately encoded.

Figure 4:
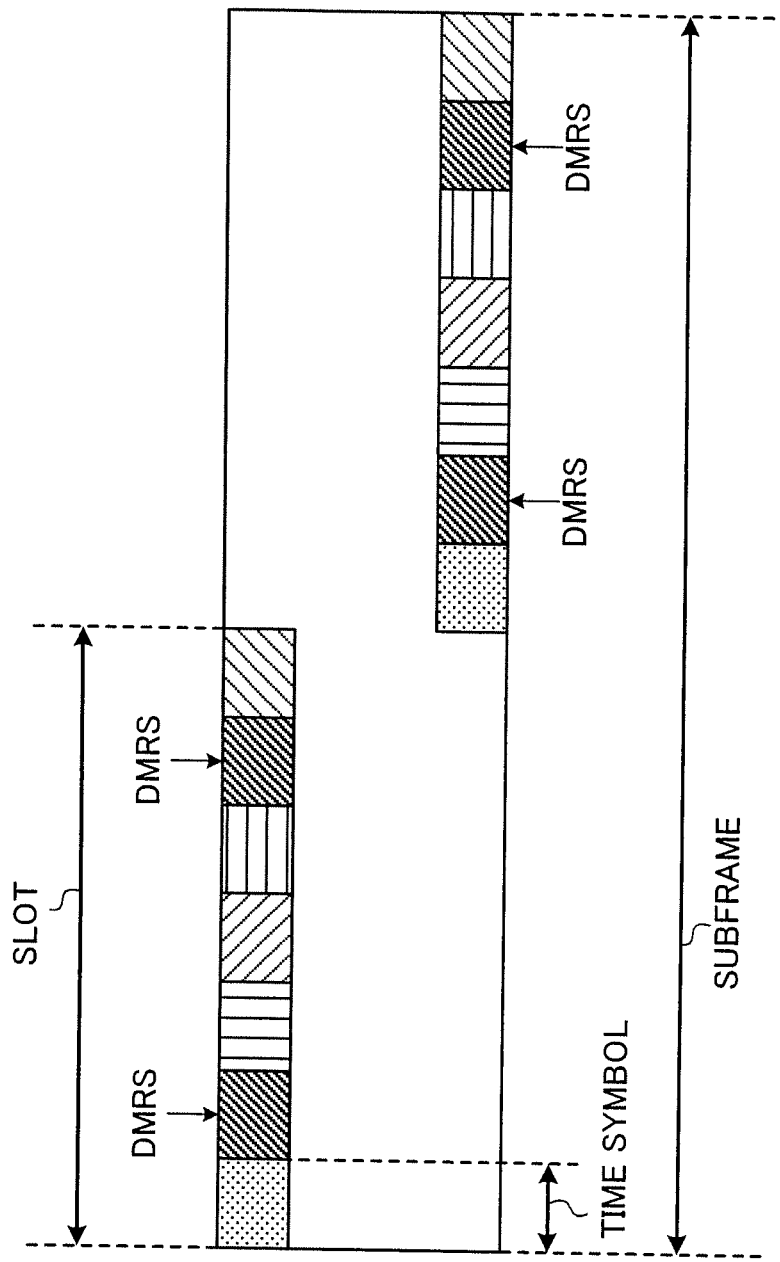
FIG. 4 is a diagram to explain an example of a new PUCCH format applied in the third example.

In the case of using joint coding, as shown in FIG. 4, a format (PUCCH format 3 with spreading factor reduction) that is obtained by reducing the orthogonal code length (spreading factor) of existing PUCCH format 3 is used as a new PUCCH format may be used.

FIG. 4 is a diagram to explain an example of a new PUCCH format. In existing PUCCH format 3, the same information bit sequence is duplicated in the time symbols in the slot, except for the DM-RS (DeModulation-Reference Signal), and multiplied by orthogonal spreading codes (OCCs). In the new PUCCH format shown in FIG. 4, by configuring the orthogonal code length (spreading factor) to 1, different information bit sequences are mapped to five time symbols in the slot, excluding the DM-RS. By this means, the new PUCCH format shown in FIG. 4 makes it possible to map information bit sequences five times as much as PUCCH format 3. No that, in FIG. 4, although the number of time symbols to which information bit sequences are mapped is 5, this is by no means limiting, and any number of time symbols, not including reference signals, may be used. Also, the orthogonal code length (spreading factor) is not limited to 1 either. Furthermore, although, in FIG. 4, the PRB to transmit the PUCCH is changed between the slots (that ism, inter-slot frequency hopping is applied), the new PUCCH format of FIG. 4 may be configured not to use frequency hopping, or frequency hopping may be configured by higher layer signaling.

Also, as for the new PUCCH format to be used in the case of joint coding, it may be possible to use a format that uses frequency resources of two or more PRBs (for example, above-described multi-PRB PUCCH format 3), a format that uses two or more orthogonal spreading codes (OCCs) (for example, above-described multi-code PUCCH format 3), a format that uses m-ary modulation such as 16 QAM, a format to combine these, or other formats.

Figure 5:
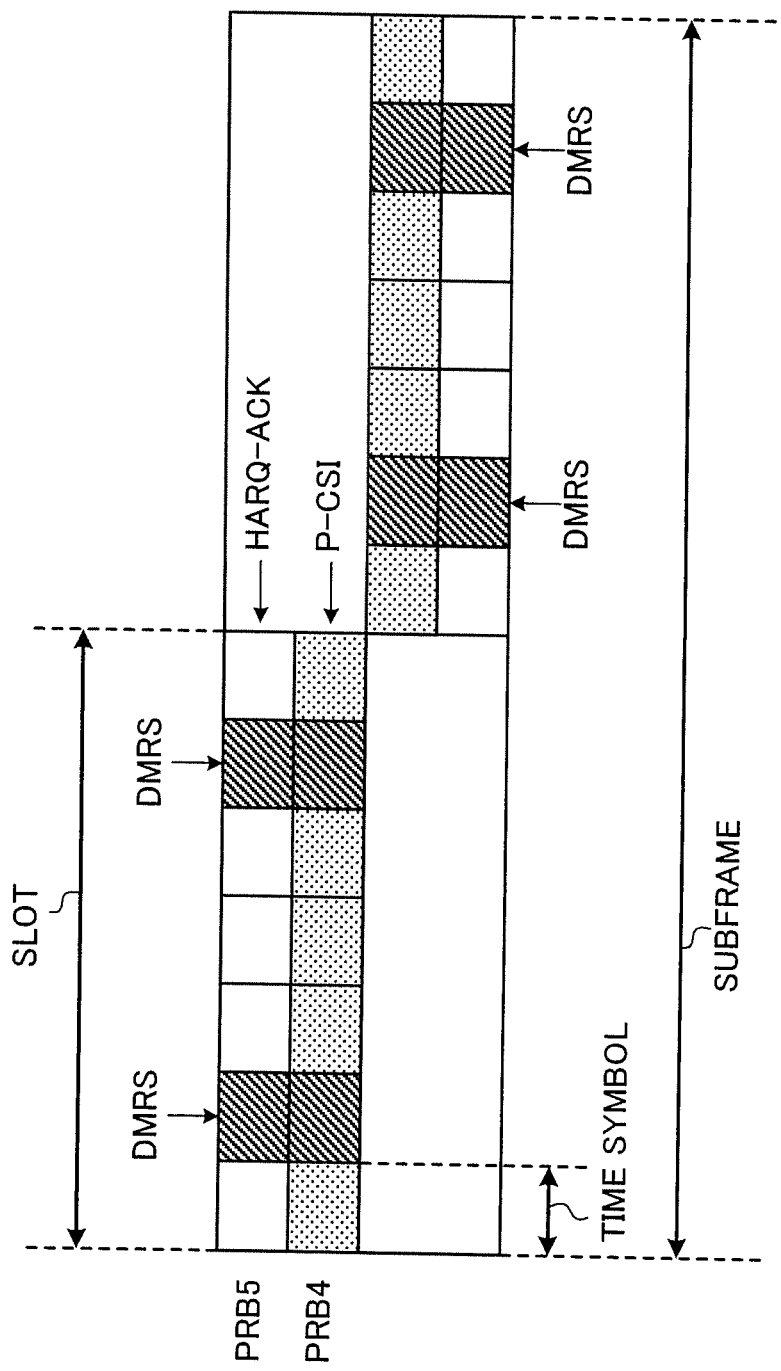
FIG. 5 is a diagram to explain another example of the new PUCCH format applied in the third example.

On the other hand, in the case of separate coding, as shown in FIG. 5, it may be possible to use a format (for example, above-described multi-PRB PUCCH format 3) that uses two or more PRBs of frequency resources, as a new PUCCH format. In the new format shown in FIG. 5, transmission acknowledgment information is mapped to PRB 5 while P-CSI is mapped to PRB 4. Note that FIG. 5 is only an example of a format to use frequency resources of two or more PRBs, and the positions and the number of time symbols where an information sequence is mapped are not limiting.

Furthermore, as the new PUCCH format used in the case of separate coding, a format using two or more orthogonal spreading codes (OCC) (for example, above-described multi-code PUCCH format 3) may be used. In this case, it may be possible to orthogonal-multiplex transmission acknowledgment information and P-CSI by applying different orthogonal spreading codes (OCCs). Furthermore, a format to reduce the spreading factor of existing PUCCH format 3 (for example, above-mentioned PUCCH format 3 with spreading factor reduction), a format to use m-ary modulation such as 16 QAM, or a format to combine these may be used, or other formats may be used.

FOURTH EXAMPLE

When the total amount of information of transmission acknowledgment information and P-CSI to be transmitted in a P-CSI transmission subframe exceeds a predetermined value, or when the amount of information of this P-CSI exceeds a predetermined value, the user terminal determines the priorities of P-CSI, according to predetermined rules, and transmits the P-CSI and transmission acknowledgment information of one or more CCs of high priority. In the fourth example, the predetermined rules (priority rules) for determining these priorities will be described. The fourth example can be combined with at least one of the second and third examples described above.

In existing systems (LTE Rel. 10 to 12), types of reporting (PUCCH reporting types), which indicate the information to be reported in periodic CSI reporting, are defined. To be more specific, type 1 in which subband CQI is reported, type 1a in which subband CQI and second PMI are reported, type 2 in which wideband CQI and PMI are reported, type 2a in which wideband CQI and first PMI are reported, type 2b in which wideband CQI and second PMI are reported, type 2c in which wideband CQI, first PMI and second PMI are reported, type 3 in which RI is reported, type 4 in which wideband CQI is reported, type 5 in which RI and PMI are reported, type 6 in which RI and PTI are reported, and so on are defined.

Furthermore, the priorities of these reporting types are determined as, for example, 3/5/6/2a>2/2b/2c/4>1/1a. Therefore, in the fourth example, the user terminal may determine the P-CSI to include in the new PUCCH format according to the priority of the reporting type. Note that the types of reporting are not limited to the above, and new reporting types may be defined. Also, the priorities of reporting types are not limited to the above examples either.

In the fourth example, the user terminal may select the P-CSI to include in the new PUCCH format based on the priority of the reporting type and the priority of the CC. By this means, even when not all of the reporting types of the next highest priority cannot be included in the new PUCCH format, the reporting types of part of the CCs can be included.

Figure 6:
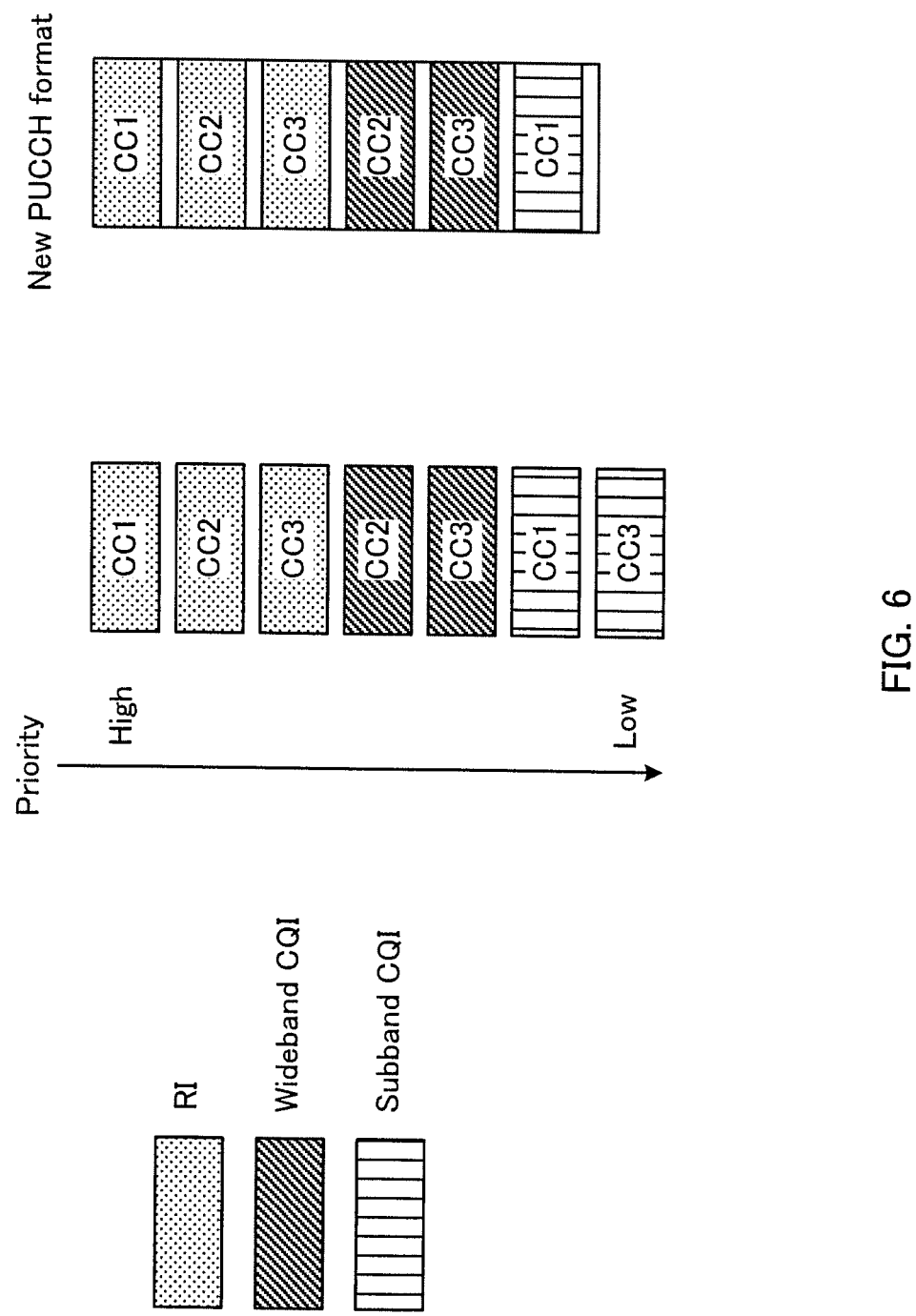
FIG. 6 is a diagram to explain an example of a priority rule applied in the fourth example.

For example, in FIG. 6, the priorities of information included in P-CSI are configured based on the above priorities of reporting types, so that, for example "rank indicator (RI)>wideband CQI>subband CQI" holds. Referring to FIG. 6, when not all of the subband CQIs, having the highest priority after the wideband CQIs, can be included in the new PUCCH format, the user terminal selects the subband CQI of the CC of the higher priority based on the CC (cell) indices, and includes this subband CQI in the new PUCCH format. For example, in FIG. 6, the priority of CC 1, which has the smaller index number, is configured higher, so that the subband CQI of CC 1 is included in the new PUCCH format. By this means, the payload of the new PUCCH format can be used (exhausted) without waste.

In the fourth example, the user terminal may determine the priority of P-CSI based on the frequency band (for example, based on whether the frequency band is a license band or an unlicensed band). For example, according to the above priorities of PUCCH reporting types, type 2a takes precedence over type 4. However, type 4 of a license band (for example, CC 1) may be prioritized over type 2 of an unlicensed band. Within the same band (within a license band or within an unlicensed band), the above-described priorities based on the type of reporting type may be applied. Note that it is also possible to determine the priority of P-CSI based on whether or not the listen-before-talk function, which was introduced in Rel. 3 and which enables inter-RAT/intra-RAT interference cancelation, is configured in the CC. In this case, in which CC the listen-before-talk control is implemented is reported in advance by way of higher layer signaling and so on.

Note that the above-described priority rule is simply an example, and is by no means limiting. For example, in addition to/in place of the above-described reporting types, PUCCH reporting modes may be used to determine priority rules. The reporting modes may be determined based on the types of CQI (wideband CQI/subband CQI) and whether or not there is a PMI to report. As possible reporting modes, for example, mode 1-0 in which a wideband CQI is reported, a 2-0 in which a subband CQI is reported, a mode 1-1 in which a wideband CQI and a PMI are reported, and a mode 2-1 in which a subband CQI and a PMI are reported are defined.

Alternatively, the priority of P-CSI may be determined based on group indices (for example, cross-carrier group indices), which are configured when CCs, to which cross-carrier scheduling is applied, are divided into groups. In Rel. 3, while CA to use up to 32 CC is introduced, the control information (CIF) for designating the indices of cross-carrier scheduling-target CCs, included in the PDCCH, is 3 bits. Therefore, cross-carrier scheduling from one CC is limited to a maximum of 8 CCs. In CA using up to 32 CCs, in order to enable cross-carrier scheduling in as many CCs as possible, Rel. 3 CA is designed so that CCs can be divided into groups of maximum 8 CCs each, and cross-carrier scheduling can be performed from one CC to a maximum of 8 CCs within each group. In this case, by configuring maximum 4 cross-carrier groups, cross-carrier scheduling can be performed from 4 CCs to maximum of 32 CCs.

Such cross-carrier groups may be configured separately, per user terminal, by higher layer signaling such as RRC signaling. In such a case, different indices are assigned to each group. This makes it possible to prevent cross-carrier scheduling between CCs having different cross-carrier group indices.

In this way, when a plurality of cross-carrier groups are configured, a priority rule to assign different priorities according to cross-carrier group indices may be provided. For example, if there is P-CSI of the same reporting type or the same reporting mode, it is possible to prioritize a smaller cross-carrier group index. Also, when there is P-CSI of the same CC index, a smaller cross-carrier group index may be prioritized.

In general, CC indices and cross carrier group indices may be managed such that smaller values are assigned to more important CCs.

That is, for example, CC index 0 and cross carrier group index 0 can be assigned to the primary cell on a fixed basis. Consequently, by preferentially transmitting P-CSI for cells of smaller cross-carrier group indices, it is possible to preferentially report the channel quality of CCs that are important in ensuring connectivity, such as PCells, and it is possible to secure the quality of communication.

Furthermore, in the fourth example, priority rules may be applied when the total amount of information of transmission acknowledgment information and P-CSI to be transmitted in a P-CSI transmission subframe exceeds a predetermined value, or when the amount of information of P-CSI exceeds a predetermined value. The maximum payload (the maximum number of bits) in the new PUCCH format may be configured as the predetermined value (that is, the threshold for applying priority rules), or, as will be described in the fifth example, the predetermined value may be configured smaller than the maximum payload.

FIFTH EXAMPLE

The maximum payload (the maximum number of bits) of the new PUCCH format depends on the physical layer configuration (for example, the spreading factor, the number of PRBs, the number of orthogonal spreading codes, the modulation scheme, etc.). Meanwhile, as the number of bits included in the new PUCCH format increases, the required received quality (for example, SINR: Signal-to-Interference plus Noise power Ratio) increases. For example, there is a possibility that the required SINR may differ by 5 dB between the case where the amount of information included in the new PUCCH format is 32 bits and the case where it is 128 bits.

As described above, when the amount of information (the number of bits) included in the new PUCCH format is increased, the required SINR becomes higher, and, as a result of failing to satisfy the required SINR, it is assumed that the new PUCCH format cannot be received. Therefore, in the fifth example, the number of bits (the amount of information) to be included in the new PUCCH format is limited to a predetermined number of bits (hereinafter referred to as the "limit value") smaller than the maximum payload (the maximum number of bits).

To be more specific, when the total amount of information of transmission acknowledgment information and P-CSI to be transmitted in a P-CSI transmission subframe exceeds the above limit value, or when the amount of information of P-CSI exceeds the above limit value, the user terminal stops transmitting (drops) part of the P-CSI. This fifth example can be combined with at least one of the second to fourth examples described above.

Figure 7:
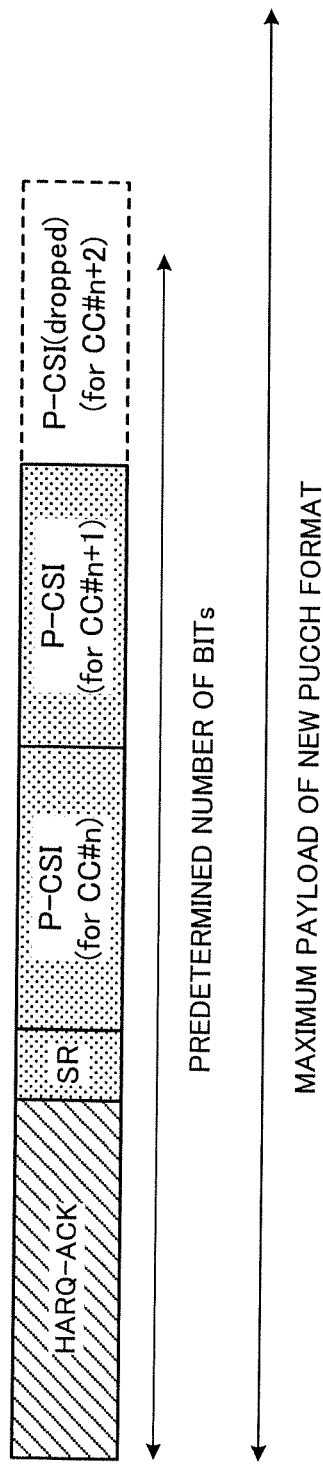
FIG. 7 is a diagram to explain an example of limit values applied in the fifth example.

As shown in FIG. 7, when the total amount of information of transmission acknowledgment information and the P-CSI of CC #n to CC #n+2 exceeds the limit value, the transmission of the P-CSI of CC #n+2,which exceeds the limit value, is canceled (dropped). When dropping P-CSI, the priority rule described in the fourth example may be applied. Note that the SR shown in this drawing means a scheduling request signal (SR), and it is thus possible to multiplex an SR in addition to the transmission acknowledgment signal and P-CSI.

Also, as described in the third example, when transmission acknowledgment information and P-CSI are encoded in joint coding, the total amount of information of transmission acknowledgment information and P-CSI for one or more CCs may be limited based on the above limit value. Alternatively, if the transmission acknowledgment information and P-CSI are encoded separately, the amount of P-CSI information may be limited based on the above limit value.

Furthermore, the above limit value may be reported (configured) from the radio base station to the user terminal by higher layer signaling. In this case, the limit value may be a value that is independent from (a value that is unrelated to) the maximum payload of the new PUCCH format.

Furthermore, the limit value may be different between a subframe (shortened PUCCH) in which the last symbol for SRS (Sounding Reference Signal) is not allocated to the PUCCH and a PUCCH subframe (normal PUCCH) to which the last symbol is also assigned to the PUCCH the maximum payload of the new PUCCH format is smaller in a shortened PUCCH than in a normal PUCCH.

Furthermore, the above-mentioned limit value may be configured based on the ratio (for example, %) with respect to the maximum payload of the new PUCCH format. In this case, the ratio may be reported from the radio base station to the user terminal by higher layer signaling. When the maximum payload to be applied to the new PUCCH format is dynamically controlled (that is, when a plurality of different maximum payloads are used), the user terminal can appropriately configure the limit value based on this ratio.

Note that dynamic control of the maximum payload may be implemented by, for example, changing the number of PRBs to apply to the new PUCCH format according to the number of CCs.

SIXTH EXAMPLE

In the first to fifth examples, when uplink user data is not transmitted in a P-CSI transmission subframe, a new PUCCH format is used instead of the PUCCH. In the sixth example, even when uplink user data is not transmitted in a P-CSI transmission subframe, P-CSI for a plurality of CCs is transmitted using a PUSCH.

To be more specific, the user terminal transmits P-CSI for a plurality of CCs using a semi-statically scheduled PUSCH (hereinafter referred to as "semi-static PUSCH"). Here, the semi-static PUSCH is a PUSCH that is scheduled in a predetermined cycle and that is validated (activated) or invalidated (deactivated or released) when a predetermined condition is satisfied).

As parameters of the semi-static PUSCH, the CSI-RNTI (CSI-Radio Network Temporary Identifier), the cycle in which the semi-static PUSCH is scheduled (CSI semi-statically scheduled interval) and so on may be reported from the radio base station to the user terminal.

For example, when the CRC (Cyclic Redundancy Check) parity bit for the payload of a downlink control channel (PDCCH (Physical Downlink Control CHannel) or an EPD-CCH (Enhanced Physical Downlink Control Channel)) is scrambled with the CSI-RNTI and "0" is configured in a predetermined field of DCI format 0, the user terminal activates the semi-static PUSCH for P-CSI.

Also, when the fields of DCI format 0 are configured as shown in FIG. 8, the semi-static PUSCH for P-CSI may be activated. On the other hand, when the fields of DCI format 0 are configured as shown in FIG. 9, the semi-static PUSCH for P-CSI may be deactivated.

(Radio Communication System)

Now, the structure of the radio communication system according to an embodiment of the present invention will be described below. In this radio communication system, the radio communication methods according to each embodiment of the present invention are employed. Note that the radio communication methods of the above-described embodiment may be applied individually or may be applied in combination.

Figure 10:
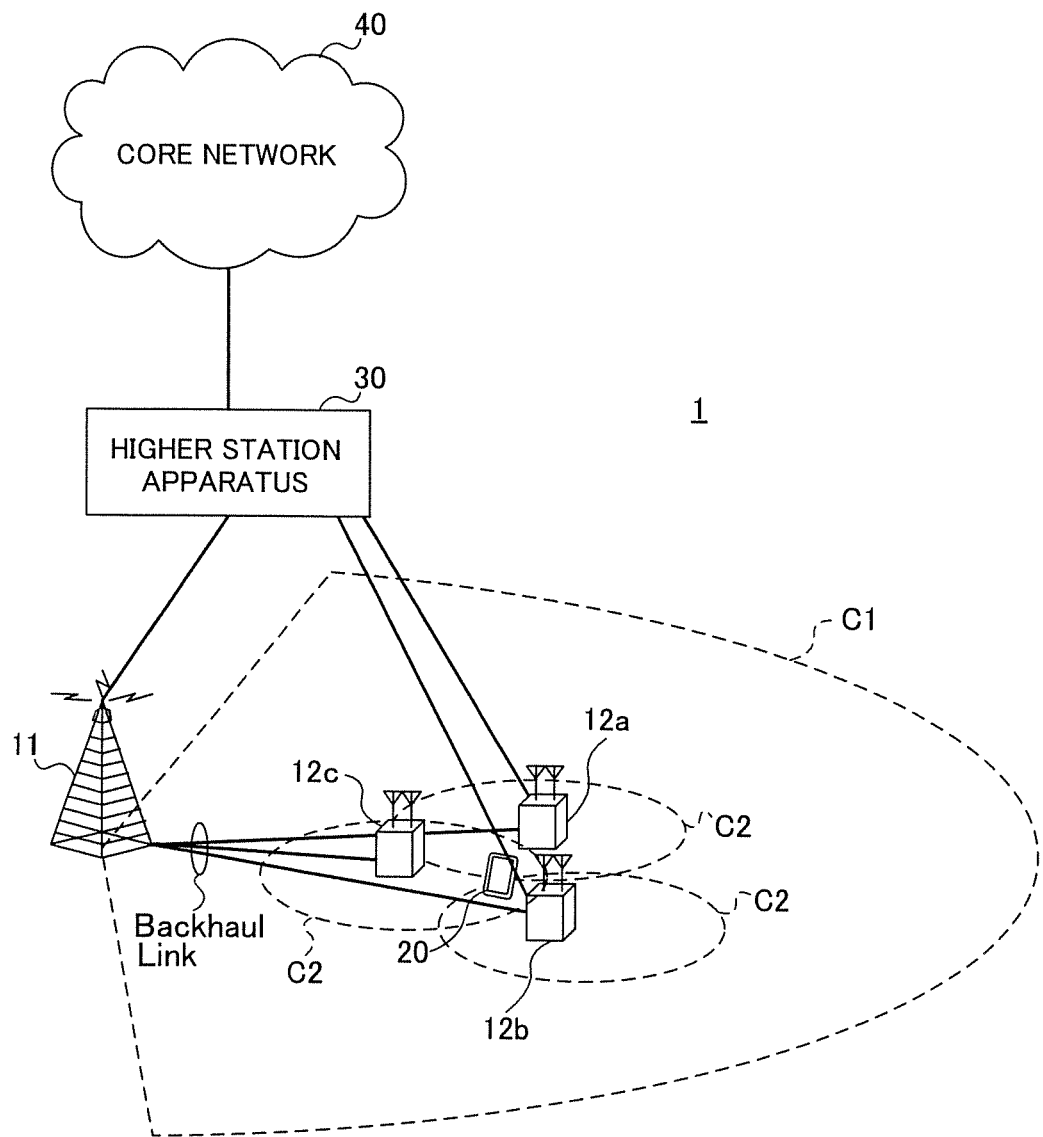
FIG. 10 is a diagram to show an example of a schematic structure of a radio communication system according to an embodiment of the present invention.

FIG. 10 is a diagram to show an example of a schematic structure of a radio communication system according to an embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 10 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks)

are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ transmission acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information) including at least one of transmission acknowledgment information (ACK/NACK) and radio quality information (CQI), is communicated by the PUSCH or the PUCCH. By means of the PRACH, random access preambles for establishing connections with cells are communicated.

<Radio Base Station>

Figure 11:
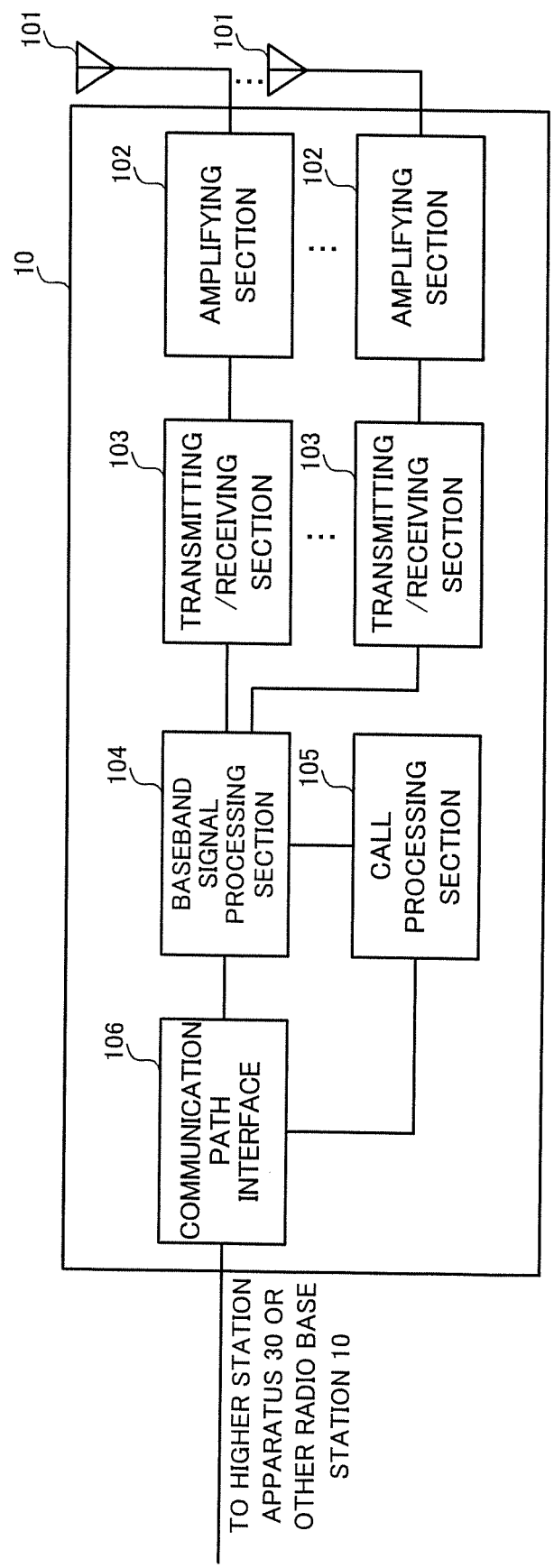
FIG. 11 is a diagram to show an example of an overall structure of a radio base station according to the present embodiment.

FIG. 11 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

Note that the transmitting/receiving sections 103 transmit downlink signals, which include uplink transmission power control information, PHR configuration information and so on, generated by the transmission signal generation section 302 described later, to the user terminals 20.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 12:
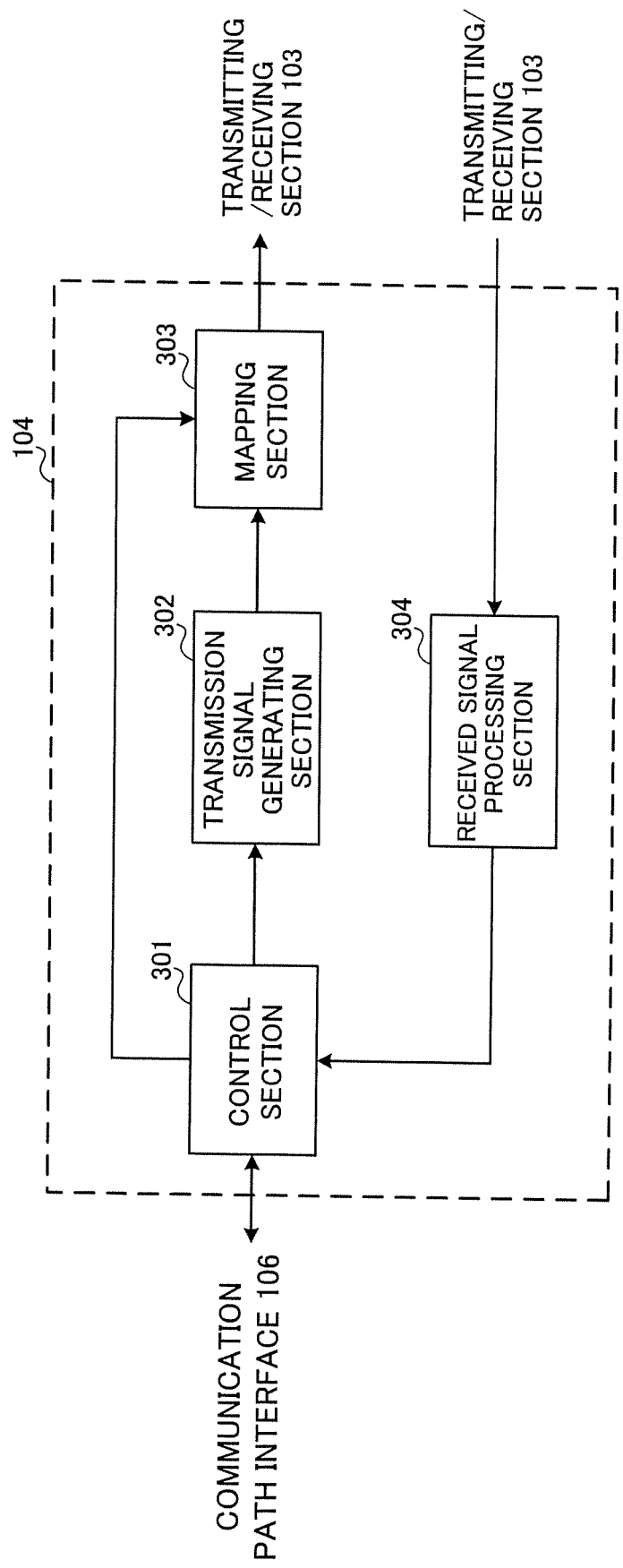
FIG. 12 is a diagram to show an example of a functional structure of a radio base station according to the present embodiment.

FIG. 12 is a diagram to show an example of a functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section (generation section) 302, a mapping section 303 and a received signal processing section 304.

The control section 301 controls the entire radio base station 10. The control section 301 controls, for example, the generation of signals by the transmission signal generation section 302, the mapping of signals by the mapping section 303, the signal receiving process by the received signal processing section 304, and the like.

To be more specific, the control section 301 controls the transmission of downlink user data (for example, controls the modulation scheme, the coding rate, the allocation of resources (scheduling), etc.) based on channel state information (P-CSI) that is periodically reported from the user terminals.

Furthermore, the control section 301 controls the mapping of downlink control information (DCI), including information (DL/UL grant) for allocating resources to downlink/ uplink user data and so on to a downlink control channel (PDCCH and/or EPDCCH). Also, the control section 301 controls the scheduling of downlink reference signals such as the CRS (Cell-specific Reference Signal), the CSI-RS (Channel State Information Reference Signal) and so on.

Furthermore, the control section 301 controls the carrier aggregation (CA) of the user terminal 20. To be more specific, the control section 301 may control the transmission signal generation section 302 to determine application of CA/changes in the number of CCs and so on, based on CSI or the like reported from the user terminals 20, and generate information to indicate such application/changes. Note that the information to indicate the application/changes may be included in control information sent by higher layer signaling.

Furthermore, the control section 301 controls periodic CSI reporting from the user terminal 20. To be more specific, the control section 301 controls the transmission signal generation section 302 to determine the cycle of a P-CSI transmission subframe and the offset value of this transmission subframe with respect to the beginning of the radio frame, and generate transmission subframe information that includes these cycle and offset value. Note that the transmission subframe information may be included in control information that is sent in higher layer signaling.

Furthermore, the control section 301 may control the transmission signal generation section 302 to determine the reporting mode and/or the reporting type of P-CSI and to generate information indicating the reporting mode and/or reporting type (fourth example). Note that the reporting mode and/or reporting type may be determined per CC. Also, the information to indicate the reporting mode and/or the reporting type may be included in control information that is sent in higher layer signaling.

Furthermore, the control section 301 may control the transmission signal generation section 302 to generate information that includes at least one of the maximum payload (the maximum number of bits) of a new PUCCH format, a limit value that is smaller than the maximum payload, and the ratio to the maximum payload (fourth and fifth examples). Note that this information may be included in control information that is sent in higher layer signaling.

The control section 301 can be constituted by a controller, a control circuit or a control device that can be described based on common understanding of the technical field to which the present invention pertains.

The transmission signal generation section 302 generates downlink signals based on commands from the control section 301 and outputs these signals to the mapping section 303. To be more specific, the transmission signal generation section 302 generates a downlink signal including at least one of the above-described information that indicates the application/changes of CA, the transmission subframe information that indicates the cycle and offset of the P-CSI transmission subframe and the information that indicates the P-CSI reporting mode and/or reporting type. Furthermore, the transmission signal generation section 302 generates a downlink reference signal such as the CRS, the CSI-RS and so on, and outputs these signals to the mapping section 303.

For the transmission signal generation section 302, a signal generator, a signal generating circuit or a signal generating device that can be described based on common understanding of the technical field to which the present invention pertains can be used.

The mapping section 303 maps the downlink signals generated in the transmission signal generation section 302 to predetermined radio resources based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs receiving processes (for example, demapping, demodulation, decoding and so on) of received signals that are input from the user terminals. The processing results are output to the control section 301. To be more specific, the received signal processing section 304 detects the PUCCH format applied to the P-CSI transmission subframe, and performs the receiving process of transmission acknowledgment information of one or more CCs and/or P-CSI of one or more CCs.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 13:
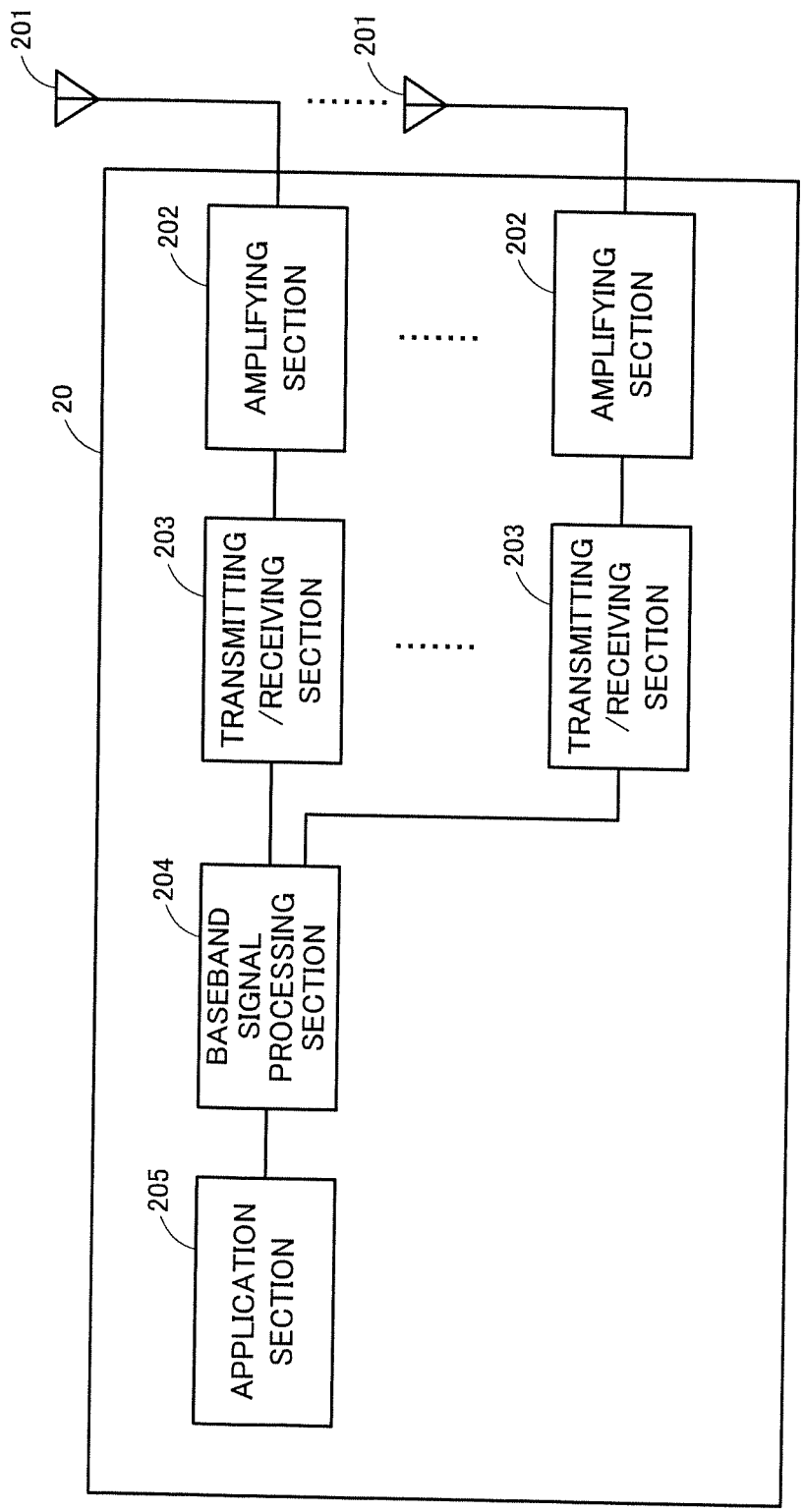
FIG. 13 is a diagram to show an example of an overall structure of a user terminal according to the present embodiment.

FIG. 13 is a diagram to show an example of an overall structure of a user terminal according to one embodiment of the present invention. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving sections 203 transmit uplink control signals (PUCCH), including transmission acknowledgement signals in response to downlink signals (for example, the PDSCH). Furthermore, the transmitting/receiving sections 203 may receive information about the resources to which uplink control signals transmitted by using existing PUCCH formats are allocated, and/or information about the CCs where uplink control signals are transmitted.

For the transmitting/receiving sections 203, transmitters/receivers, transmitting/receiving circuits or transmitting/receiving devices that can be described based on common understanding of the technical field to which the present invention pertains can be used. Furthermore, a transmitting/receiving section 203 may be structured as one transmitting/receiving section, or may be formed with a transmission section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 14:
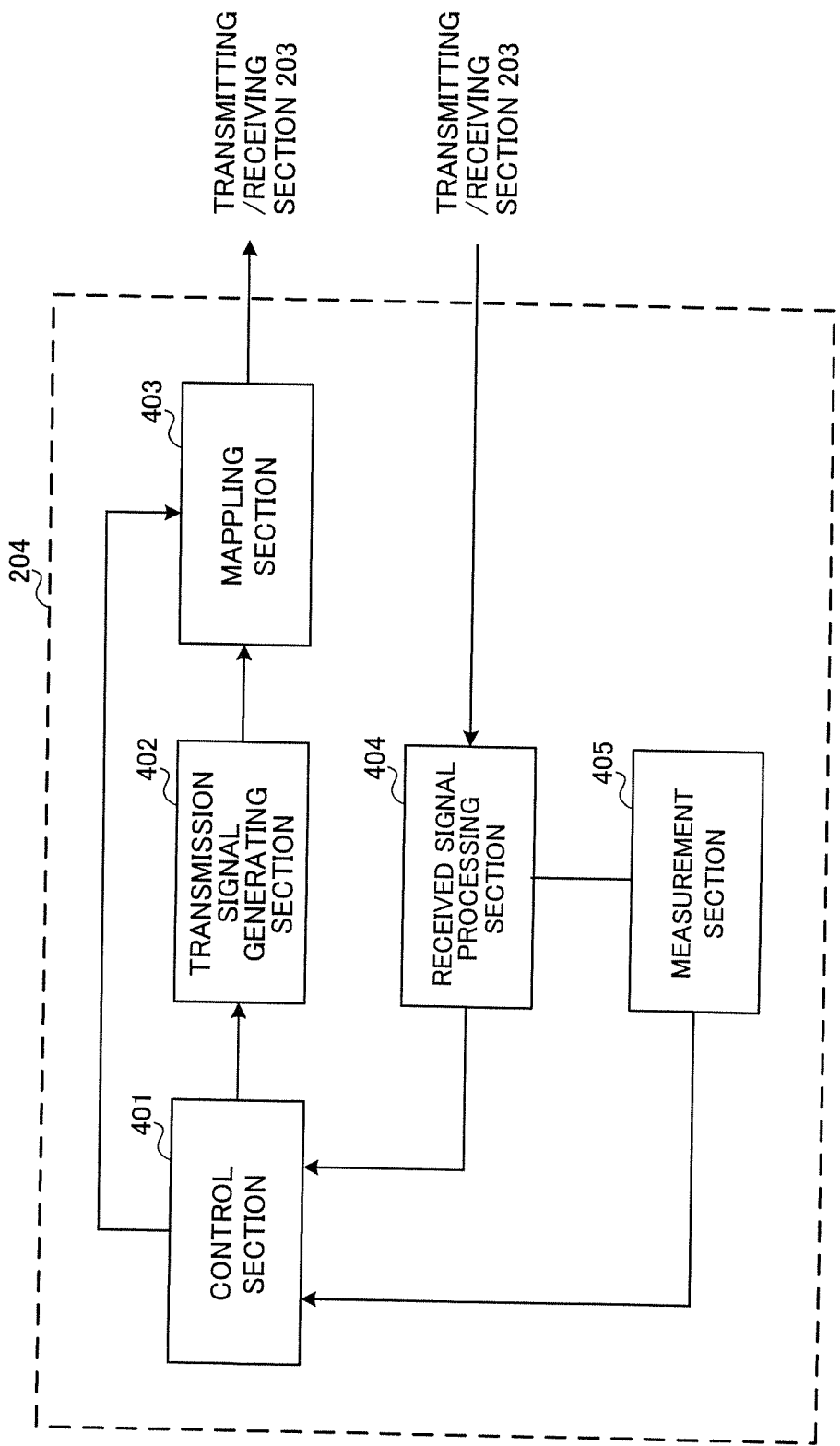
FIG. 14 is a diagram to show an example of a functional structure of a user terminal according to the present embodiment.

FIG. 14 is a diagram to show an example of a functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of signals in the transmission signal generation section 402, the mapping of signals in the mapping section 403, the signal receiving process in the received signal processing section 404, and so on.

To be more specific, the control section 401 controls the PUCCH format to apply to the transmission of P-CSI. Furthermore, the control section 401 can apply a new format, having larger capacity than the PUCCH formats of existing systems, in which the number of CCs that can be configured is five or less. The control section 401 may apply the new PUCCH format regardless of whether or not transmission acknowledgment information is transmitted (first example).

Furthermore, the control section 401 may control the PUCCH format to apply to P-CSI transmission subframes depending on whether or not transmission acknowledgment information is transmitted (the second to fifth examples). For example, when there is no transmission acknowledgment information transmitted in a P-CSI transmission subframe, the control section 401 may apply existing PUCCH format 2. Also, if there is transmission acknowledgment information to be transmitted in a P-CSI transmission subframe (when transmission acknowledgment information for at least 1 CC is transmitted), the user terminal may apply a new PUCCH format.

Furthermore, when there is transmission acknowledgment information to be transmitted in a P-CSI transmission subframe, the control section 401 may control the PUCCH format to apply to this transmission subframe based on the number of CCs the transmission acknowledgment information pertains to (second to fifth examples). For example, when transmission acknowledgment information for 6 or more CCs is transmitted in a P-CSI transmission subframe, the control section 401 may apply a new PUCCH format. Also, when transmission acknowledgment information for one CC is transmitted in a P-CSI transmission subframe, the control section 401 may apply PUCCH format 2a/2b. Furthermore, when transmission acknowledgment information for five or fewer CCs is transmitted in the transmission subframe, the control section 401 may apply PUCCH format 3.

Furthermore, even when no uplink user data is transmitted in a P-CSI transmission subframe (when no PUSCH is not allocated by a UL grant), the control section 401 may control the transmission signal generation section 402 to generate an uplink data signal (PUSCH) including P-CSI for a plurality of CCs.

Also, the control section 401 controls the transmission signal generation section 402 so as to generate P-CSI based on channel state measurement results from the measurement section 405. As described above, P-CSI includes at least one of an RI, a CQI, and a PMI.

For the control section 401, a controller, a control circuit or a control device that can be described based on common understanding of the technical field to which the present invention pertains can be used.

The transmission signal generation section 402 generates uplink signals based on commands from the control section 401, and outputs these signals to the mapping section 403. For example, the transmission signal generation section 402 generates an uplink control signal (PUCCH), which includes P-CSI of one or more CCs, based on a command from the control section 401. Furthermore, the transmission signal generation section 402 may generate an uplink control signal that includes P-CSI for a plurality of CCs (first example), or may generate an uplink control signal that includes transmission acknowledgment information and P-CSI for one or more CCs (second to fifth examples).

Also, the transmission signal generation section 402 generates an uplink data signal (PUSCH) based on a command from the control section 401. For example, when a UL grant is included in a downlink control signal that is reported from the radio base station 10, the control section 401 commands the transmission signal generation section 402 to generate an uplink data signal. Furthermore, the transmission signal generation section 402 may generate an uplink data signal including P-CSI for a plurality of CCs based on a command from the control section 401 (sixth example).

For the transmission signal generation section 402, a signal generator, a signal generating circuit or a signal generating device that can be described based on common understanding of the technical field to which the present invention pertains can be used.

The mapping section 403 maps the uplink signals (uplink control signals and/or uplink data signal) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of downlink signals (for example, downlink control signals transmitted from the radio base station, downlink data signals transmitted in the PDSCH, and so on). The received signal processing section 404 outputs the information received from the radio base station 10, to the control section 401. The received signal processing section 404 reports, for example, broadcast information, system information, information on application/changes in RRC signaling, DCI and CA, information about P-CSI transmission subframes, information to indicate the reporting type and/or reporting mode of P-CSI, and so on, to the control section 401.

The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Measurement of the channel state may be performed for each CC.

The measurement section 405 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, radio resources may be specified by indices. Also, "channels" and/or "symbols" may be replaced by "signals" (or "signaling"). Also, "signals" may be "messages." Furthermore, "component carriers" (CCs) may be referred to as "carrier frequencies," "cells" and so on.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may include, for example, an RRC connection setup message, RRC connection reconfiguration message, and so on.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-099422, filed on May 14, 2015, including the specification, drawings and abstract, is incorporated herein by reference in its entirety.

The invention claimed is:

1. A user terminal comprising:
    a transmitter that transmits an uplink control information (UCI) using a physical uplink control channel (PUCCH) format that satisfies at least one of the following conditions: the PUCCH format can use a plurality of resource blocks and the PUCCH format has a spreading factor of less than 5; and
    a processor that selects, based on a given number of bits that is smaller than a maximum number of bits of the PUCCH format, a channel state information included in the UCI, the UCI including at least one of a scheduling request and a transmission acknowledgement information.

2. The user terminal according to claim 1, wherein the given number of bits is determined based on a ratio of information bits to the maximum number of bits of the PUCCH format.

3. The user terminal according to claim 2, wherein the ratio is configured by higher layer signaling.

4. The user terminal according to claim 1, wherein the channel state information is a periodic channel state information.

5. A radio communication method for a user terminal, comprising:
    transmitting an uplink control information (UCI) using a physical uplink control channel (PUCCH) format that satisfies at least one of the following conditions: the PUCCH format can use a plurality of resource blocks and the PUCCH format has a spreading factor of less than 5; and
    selecting, based on a given number of bits that is smaller than a maximum number of bits of the PUCCH format, a channel state information included in the UCI, the UCI including at least one of a scheduling request and a transmission acknowledgement information.

* * * * *